April 27, 1926.

J. C. HAGGART, JR

AUTOMOBILE FLOOR BOARD

Filed Sept. 26, 1923

1,582,176

Inventor:
John C. Haggart Jr.

By

Attorneys

Patented Apr. 27, 1926.

1,582,176

UNITED STATES PATENT OFFICE.

JOHN C. HAGGART, JR., OF ALMA, MICHIGAN, ASSIGNOR, BY MESNE ASSIGNMENTS, TO DETROIT PATENTS HOLDING COMPANY, OF DETROIT, MICHIGAN, A CORPORATION OF MICHIGAN.

AUTOMOBILE FLOOR BOARD.

Application filed September 26, 1923. Serial No. 664,877.

*To all whom it may concern:*

Be it known that I, JOHN C. HAGGART, Jr., a citizen of the United States of America, residing at Alma, in the county of Gratiot and State of Michigan, have invented certain new and useful Improvements in Automobile Floor Boards, of which the following is a specification, reference being had therein to the accompanying drawings.

This invention relates to a toe board construction for automobile cabs and my invention aims to provide a sectional flooring that may be used in automobile cabs and bodies to provide a durable floor composed of boards or sections that may be easily and quickly removed to permit of easy access being had to mechanism or automobile parts below the flooring. In making the flooring of sections certain sections may be designed to provide clearance for control levers, pedals and other operatable members or connections and the connections of the flooring subjected to more wear than others may be easily and quickly removed and replaced by new sections.

My invention further aims to provide toe or floor boards made of composite material which will withstand considerable wear and tear, serve as heat insulators, and afford a soft or cushion-like floor in contradistinction to a hard wood or metallic floor.

My invention will be hereinafter specifically described and then claimed, and reference will now be had to the drawing, wherein—

As illustrating an installation of toe or floor boards, I have shown a portion of an automobile chassis as including side frames 1, a dash assembly 2, and transverse members 3, all cooperating as a support for floor boards or sections, each of which is preferably rectangular in plan or of such configuration that when placed edge to edge the boards or sections will form a floor or foot board on the chassis of the automobile. Some of the boards or sections may be inclined relative to others, particularly where pedals or levers extend through the floor.

Figure 1:
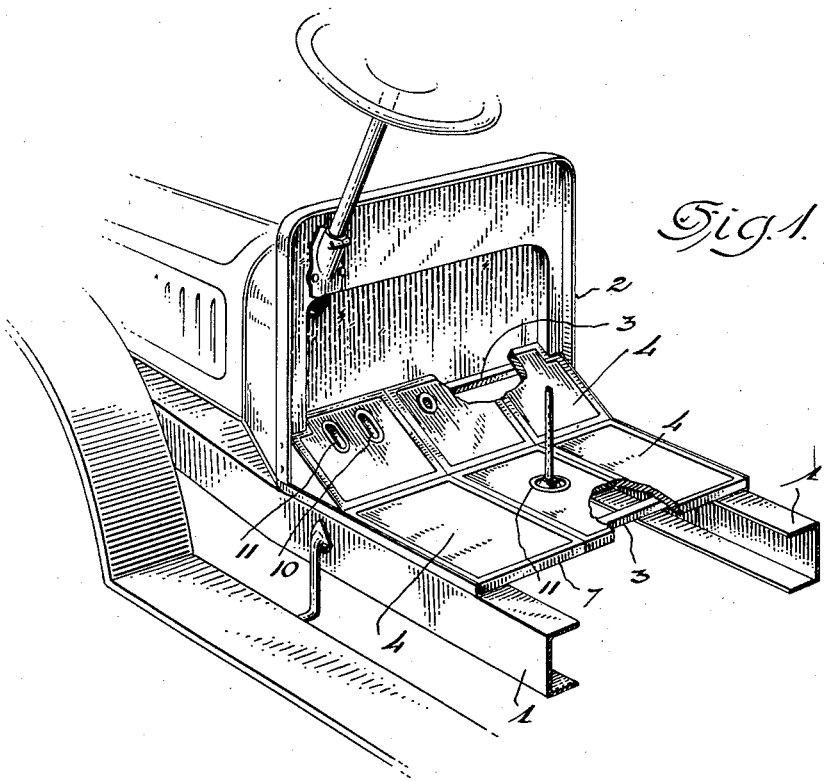
Figure 1 is a perspective view of a floor composed of boards or sections in accordance with my invention, showing the floor in connection with an automobile chassis.
Figure 2:
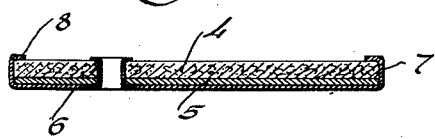
Fig. 2 is a cross sectional view of one of the floor sections or boards.
Figure 3:
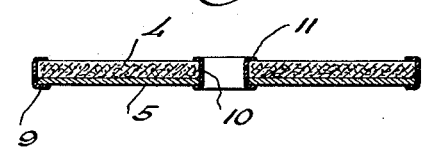
Fig. 3 is a similar view of another form of floor board.

Considering that form of floor board shown in Fig. 2, the body of the board is composed of a heavy piece of linoleum 4 mounted on a metallic plate 5 corresponding in area to the linoleum 4 and these two pieces are mounted in a thin metallic casing 6, preferably made of sheet metal with its side walls 7 inturned to provide a marginal retaining flange 8 by which the piece of linoleum and the metallic plate are retained within the sheet metal casing.

Instead of using the casing 6, I may bind the edges of the linoleum 4 and the metallic plate 5 with a sheet metal frame 9, and in both of these instances the floor board may have one or more openings provided with metallic liners 10 having the upper and lower edges thereof clenched or flanged, as at 11 to protect the raw edges of the linoleum and the metallic plate, besides providing protection for the side walls of the openings against the movable pedals or levers extending through such opening.

Figure 4:
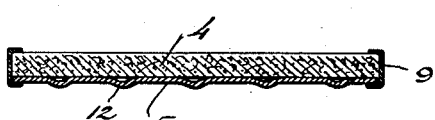
Figs. 4 and 5 are similar views illustrating other simple modifications of my invention.

Another form of floor board is shown in Fig. 4 where the linoleum 4 is thicker, the metal plate 5 thinner and corrugated or otherwise ribbed, as at 12 to lend rigidity to said metallic plate. The marginal edges of the plate 5 and the linoleum 4 may be increased by a metallic frame 9.

Figure 5:
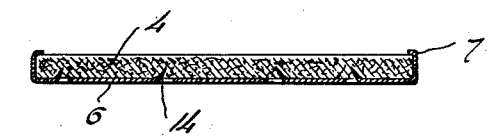

Still another form of board is shown in Fig. 5 wherein a thick piece of linoleum 4 or any composite material, as asphalt or cement is placed in a sheet metal casing 6 and the casing cut and stamped to provide inwardly projecting anchoring lugs 14 by which the composite material will be anchored and firmly held within the casing.

There are various materials that may be substituted for the linoleum or composite materials mentioned herein, but I prefer to use a material that will withstand the elements, considerable wear and tear, resist heat, and be as easy as possible on the feet. The floor boards, when placed, edge to edge, will remain in place each possessing sufficient weight to prevent accidental displacement, and while in the drawing there are illustrated the preferred embodiments of my invention, it is to be understood that the construction and materials may be changed, the floor boards made of various configurations, and such other alterations made as are permissible by the appended claim.

What I claim is:—

A floor structure for a vehicle chassis composed of sections arranged edge to edge, each section comprising a thin rigid metal plate, a relatively thick piece of material on said plate, and a sheet metal frame at the edges of said piece of material and said plate, said frame having inturned upper flanges extending onto the upper face of the piece of material and inturned lower flanges extending onto the lower face of said metal plate with said flanges cooperating in binding the edges of said metal plate and piece of material together.

In testimony whereof I affix my signature.

JOHN C. HAGGART, Jr.